Patented Nov. 12, 1929

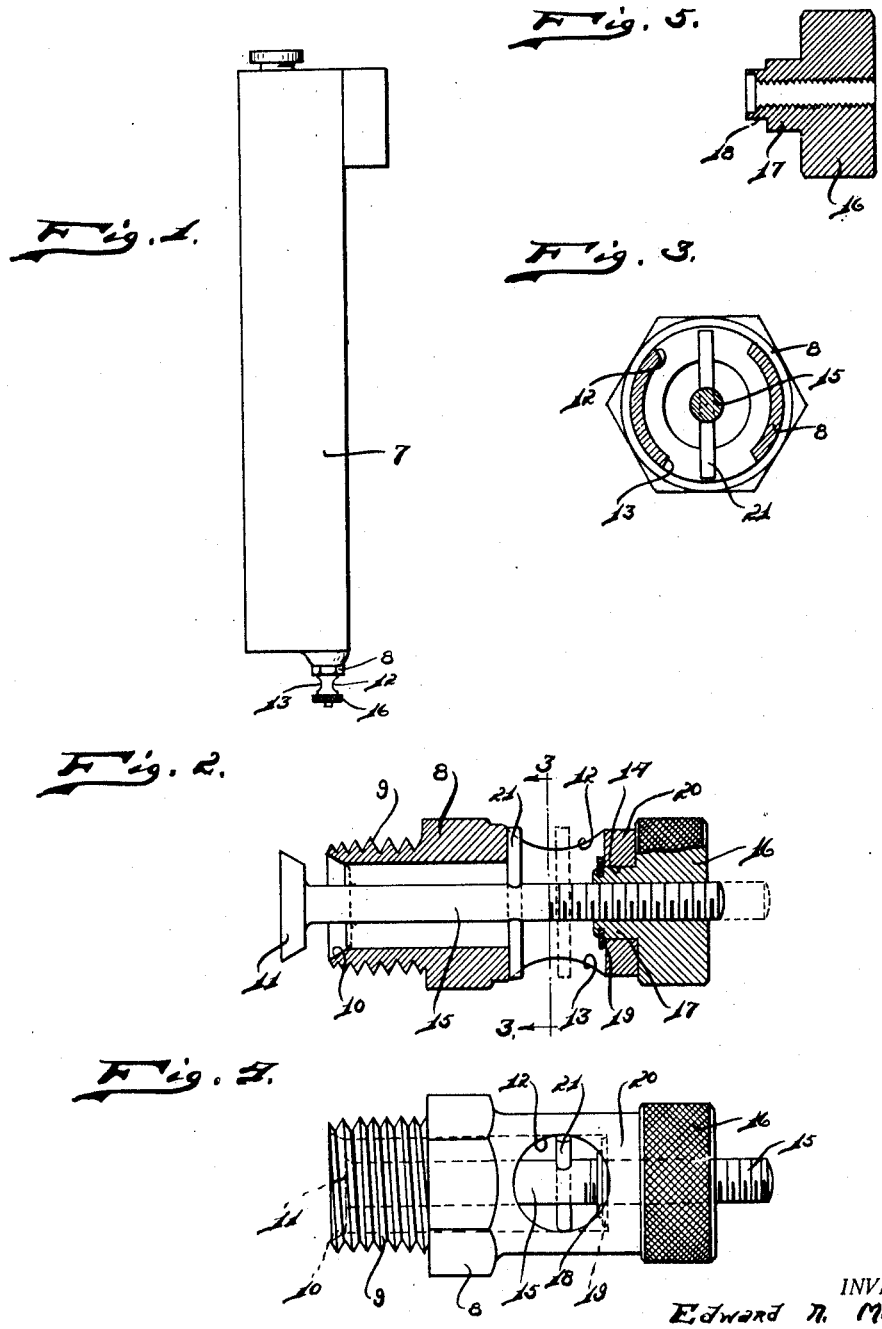

1,735,050

UNITED STATES PATENT OFFICE

EDWARD N. McCOMB, OF DETROIT, MICHIGAN

OUTLET-CONTROL VALVE

Application filed March 19, 1928. Serial No. 262,609.

My invention relates to a new and useful improvement in an outlet control valve adapted for mounting in outlet openings to control the flow of fluid therefrom and particularly adapted for use on vehicle radiators.

It is an object to provide a control valve of this class which will be simple in structure, economical of manufacture, and highly efficient in use.

Another object of the invention is the provision of a control valve of this class in which a maximum area of the outlet opening may be exposed by a simple operation of the controlling mechanism.

Another object of the invention is the provision of a valve of this class in which positive means are used for moving the valve from its seat and returning it to its seat.

Another object of the invention is the provision in the stem of the valve of means for preventing rotation of the same relatively to the nut used for moving the same axially, and also for limiting axial movement of the same in one direction beyond a predetermined distance.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the radiator showing the invention applied.

Fig. 2 is a longitudinal central sectional view of the invention.

Fig. 3 is a sectional view taken on line 3—3 of Fig. 2.

Fig. 4 is a side elevational view of the invention.

Fig. 5 is a central sectional view of the nut used in the invention in its original form.

In the drawings I have shown a radiator 7 with the invention applied.

The invention comprises a shell 8 having a threaded portion 9 which is adapted to thread into the outlet opening of the radiator or other article on which it is used. The end of the threaded portion is provided with a valve seat 10 upon which the valve 11 is adapted to seat. This shell 8 is formed cup-shaped and provided, adjacent its base, with diametrically opposite openings 12 and 13. An opening 14 is formed in the base.

Extending axially of the shell and secured to the valve 11 is a stem 15 which is threaded at its free end, and threaded into a nut 16 which has a neck 17 engaging in the opening 14.

As shown in Fig. 5, this neck 17 terminates in a reduced portion 18. Positioned upon the neck 17 and held in position by the reduced portion 18, which is doubled thereover is a retaining washer 19 positioned in engagement with the inner surface of the base 20 of the shell 8. Projecting through the stem 15 and extending outwardly therefrom at opposite sides thereof so as to engage in the openings 12 and 13, is a pin 21.

In operation, when the shell 8 has been threaded into the outlet opening, in order to close the valve the nut 16 is rotated, the washer 19 being so attached as to permit free rotation of the nut 16, the neck 17 serving as a bearing in the opening 14. This threading of the nut 16 will move the valve 11 into engagement with the seat 10, and in this movement the pin 21 will engage the edges of the openings 12 and 13 and prevent rotation of the stem 15 in unison with the nut 16.

When it is desired to open the valve a reverse rotation of the nut 16 is effected and the pin 21 will again prevent rotation of the stem 15. This pin 21 will also limit the opening movement of the valve so that an unthreading of the nut 16 from the stem 15 will be prevented.

In this way, it is evident that a positive movement of the valve in both directions is effected, and that its movement in one direction is limited by the pin 21.

Should the nut 16 have a tendency to unthread on the stem 15, the pressure of the water or other material against the valve 11 tending to hold it on its seat 10, will resist this unthreading movement, so that a secure and safe arrangement is provided.

It is believed evident that by using a valve of this type a larger area of the outlet opening is exposed to the material than where a stop cock is used.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. An outlet valve of the class described, comprising: a cup-shaped shell having a valve seat formed at its open end, and provided, adjacent its closed end, with a pair of diametrically extending openings; a valve for seating on said valve seat; a stem secured to said valve and extended axially through the closed end of said cup-shaped member; means on said stem engageable in said openings for preventing rotation of said stem relatively to said shell beyond a predetermined distance; and threaded means for effecting axial movement of said valve relatively to said shell.

2. An outlet valve of the class described, comprising: a cup-shaped shell having a valve seat formed at its open end and provided with lateral openings adjacent its closed end; a valve for seating on said seat; a stem on said valve projected axially of said shell and through the base thereof, said stem adjacent its free end being threaded; a pin projecting diametrically outwardly from said stem at opposite sides thereof and engaging in said openings; and a nut carried by and rotatable relatively to said shell and threaded on said threaded end of said stem.

3. An outlet valve of the class described, comprising: a cup-shaped shell having a valve seat formed at its open end and provided with lateral openings adjacent its closed end; a valve for seating on said seat; a stem on said valve projected axially of said shell and through the base thereof, said stem adjacent its free end being threaded; a pin projecting diametrically outwardly from said stem at opposite sides thereof and engaging in said openings; a nut threaded on said stem; a reduced portion on said nut engaging in an opening formed in the base of said shell; and securing means on said reduced portion and positioned within said shell for preventing axial movement of said nut relatively to said shell, said nut being rotatable relatively to said shell.

4. An outlet valve of the class described, comprising: a cup-shaped shell having a valve seat formed at its open end and provided with lateral openings adjacent its closed end; a valve for seating on said seat; a stem on said valve projected axially of said shell and through the base thereof, said stem adjacent its free end being threaded; a pin projecting diametrically outwardly from said stem at opposite sides thereof and engaging in said openings; a nut threaded on said stem; a reduced portion on said nut engaging in an opening formed in the base of said shell; a washer positioned within said shell and embracing said neck, said neck being doubled over on said washer, said nut being rotatable relatively to said shell and immovable axially thereof.

5. An outlet valve of the class described comprising: a shell having a valve seat formed in one end; a valve for seating on said valve seat; a stem on said valve projected axially therefrom through the opposite end of said shell; rotatable means cooperating with said stem for moving said valve axially; and means on said stem engageable with said shell for preventing complete rotation of said valve.

In testimony whereof I have signed the foregoing specification.

EDWARD N. McCOMB.